United States Patent
Geißler et al.

(10) Patent No.: US 7,326,010 B2
(45) Date of Patent: Feb. 5, 2008

(54) MOTOR SPINDLE

(75) Inventors: Alfred Geißler, Pfronten (DE); Manfred Kuisel, Pfronten (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 0 days.

(21) Appl. No.: 11/601,009

(22) Filed: Nov. 16, 2006

(65) Prior Publication Data
US 2007/0110533 A1 May 17, 2007

(30) Foreign Application Priority Data
Nov. 17, 2005 (DE) ............... 20 2005 018 002 U

(51) Int. Cl.
*B23C 1/00* (2006.01)
(52) U.S. Cl. ............... 409/231; 409/232; 409/233; 409/135; 310/52; 408/239 R
(58) Field of Classification Search ............... 409/231, 409/232, 233, 234, 135, 136; 408/239 R, 408/240; 310/52, 53, 54, 57, 58
See application file for complete search history.

(56) References Cited

U.S. PATENT DOCUMENTS

| | | | | |
|---|---|---|---|---|
| 4,915,553 A | * | 4/1990 | Lazarevic | 409/233 |
| 4,951,578 A | * | 8/1990 | von Haas et al. | 409/136 |
| 4,957,398 A | * | 9/1990 | Schneider et al. | 409/136 |
| 5,009,554 A | * | 4/1991 | Kameyama et al. | 409/231 |
| 5,145,298 A | * | 9/1992 | Marantette | 409/135 |
| 5,782,586 A | * | 7/1998 | Geissler | 409/231 |
| 5,878,475 A | * | 3/1999 | Stutsman | 29/434 |
| 6,280,124 B1 | * | 8/2001 | Ammann | 310/12 |
| 6,663,548 B2 | * | 12/2003 | Mochida et al. | 409/232 |
| 6,843,623 B2 | * | 1/2005 | Geissler | 409/231 |
| 6,951,256 B1 | * | 10/2005 | Xiao | 409/233 |
| 2004/0052601 A1 | * | 3/2004 | Bernhard et al. | 409/231 |

FOREIGN PATENT DOCUMENTS

| | | |
|---|---|---|
| DE | 195 32 976 A1 | 3/1997 |
| DE | 199 60 350 A1 | 6/2001 |
| DE | 100 27 750 B4 | 12/2001 |
| EP | 0 780 192 A1 | 6/1997 |

* cited by examiner

Primary Examiner—Dana Ross
(74) Attorney, Agent, or Firm—The Maxham Firm

(57) ABSTRACT

A motor spindle for machine tool. The motor spindle having a spindle housing mounted on a machine part, a work spindle supported in the spindle housing in axially spaced roller bearings, an electric drive motor the stator of which is fixed in the spindle housing and the rotor of which is fixed to the work spindle, a clamping unit for a tool disposed in the work spindle and operable by a hydraulic ring cylinder against the force of a spring unit, and an internal coolant supply for the tool integrated in the clamping unit and comprising a rotational feedthrough for the coolant provided within the hydraulic ring cylinder For a technically simple and low-cost implementation of maintenance and repair services on the motor spindle the work spindle as well as the rotor, the clamping unit and the bearing arrangements are formed as a modular assembly mountable in the spindle housing carrying the stator from the front side, the ring cylinder for releasing the clamping unit and the rotational feedthrough being disposed in an end portion of the spindle housing.

16 Claims, 2 Drawing Sheets

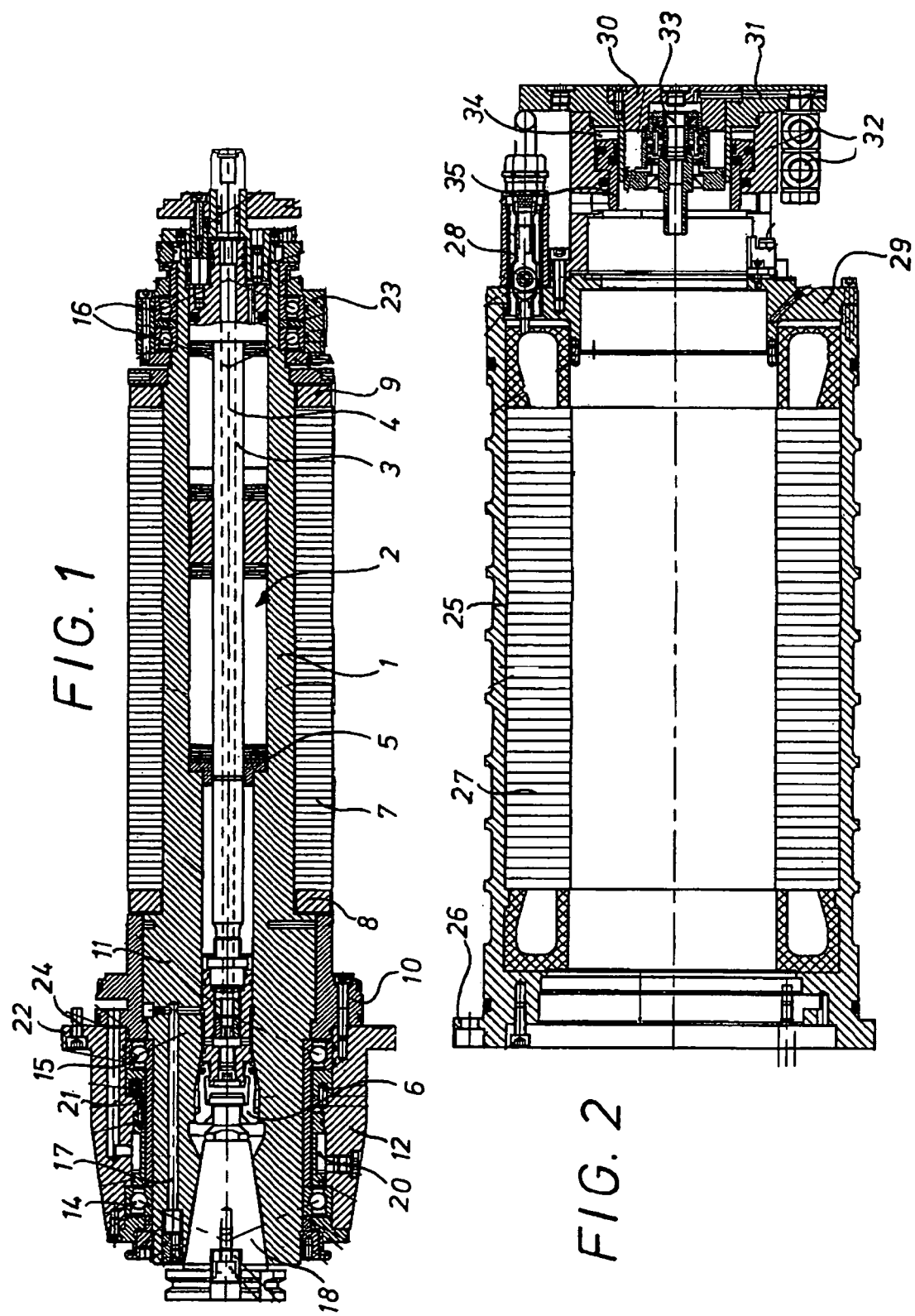

MOTOR SPINDLE

BACKGROUND

1. Field of the Invention

The invention relates generally to a motor spindle for machine tools.

2. Background Discussion

Spindle units comprising an internal coolant supply to the tool through the hollow shaft of the work spindle enable a high machining performance and relatively long tool lives of the tools. The critical parts of the machining tools are intensely cooled by the internally supplied coolant so that overheating of, and resulting damage to, the critical tool sections is avoided. However, the internal coolant system requires a considerable technical complexity in that it is typically connected with an extension of the dimensions of the spindle.

From the European patent publication 0 780 192 a motor spindle for machine tools is known in which an internal coolant supply is integrated in the clamping unit. On the machine side end portion of the housing the operating means for the clamping unit is provided which is formed as a cylinder/piston unit comprising a ring-cylinder-shaped piston. The rotational feedthrough for the cooling liquid is disposed in the cavity of the ring-cylinder-shaped piston, or the ring cylinder, whereby a particularly space-saving arrangement of the operating mechanism and the rotational feedthrough is achieved.

From German patent 100 27 750 B a motor spindle for a machine tool is known which contains a work spindle or spindle shaft supported in a spindle housing in at least two axially spaced bearings. The spindle shaft is part of a modular unit insertable into the spindle housing for exchange. In addition to the front spindle bearings a further support bearing by which the spindle shaft is rotatably supported on the spindle housing and which comprises an own biasing unit is provided in the housing side section of the spindle shaft to increase the stability of the spindle shaft.

Further, a motor spindle is known from German patent publication 195 32 976 A in which the work spindle is supported in two axially spaced pairs of roller bearings and carries the rotor of the electric drive motor on its freely projecting rear end portion. In this motor spindle also an assembly formed by the work spindle, the roller bearing arrangements, and the rotor can be mounted in and removed from a housing assembly toward the front side after screw connections have been released. The mounting capability facilitates and simplifies the maintenance and repair of motor spindles since the inner assembly containing the more susceptible components can generally be removed in situ. In contrast, the complete spindle unit, including the secondary components, has to be removed from the machine in case the conventional procedure for carrying out maintenance, repair, and inspection procedures which regularly necessitates considerable efforts.

SUMMARY OF THE INVENTION

It is a purpose of the invention to provide a motor spindle for machine tools in which maintenance and preservation work can be carried out in a simple manner despite of an internal cooling system.

According to an embodiment of the invention, this purpose is accomplished by forming a modular assembly of the work spindle and the rotor of the clamping unit for the tool as well as the bearing arrangements. The modular assembly is mountable in the housing accommodating the stator from the front side, the ring cylinder for releasing the clamping unit and the rotational feedthrough for the coolant being disposed in an end portion of the spindle housing.

In the motor spindle according to an embodiment of the invention the assembly comprising the work spindle, the rotor, and the clamping unit can be separated from the assembly containing the housing, including the stator, and removed toward the front side in a simple manner only by releasing some screws. This enables maintenance and repair work to be carried out in situ without necessitating the removal of the complete motor spindle.

According to an embodiment of the invention the rotational feedthrough comprises a sealing sleeve which can be pressed against a stub by the force of a spring. The sleeve is disposed in the rear portion of the spindle housing within the ring cylinder. The stub is a part of the detachable assembly comprising the work spindle and the rotor, the sleeve as well as the stub each comprising a wear-resistant sealing and sliding ring.

According to another embodiment of the invention the machine side roller bearing arrangement of the work spindle is disposed in a stable support ring detachably fitted into a recess in the spindle housing. The support ring is also removed when the assembly comprising the work spindle and the rotor is dismounted. The support ring surrounding the rear roller bearing arrangement provides for a secure and low-vibration support of the rear end of the work spindle in the spindle housing.

BRIEF DESCRIPTION OF THE DRAWING

The objects, features, and advantages of the method according to the invention will be more clearly perceived from the following detailed description, when read in conjunction with the accompanying drawing, in which:

FIG. 1 is an axial cross section of a detachable modular assembly including the work spindle, the rotor and a clamping unit in accordance with the invention;

FIG. 2 is an axial cross section of the assembly containing the stator and the spindle housing of FIG. 1.

DETAILED DESCRIPTION OF THE PREFERRED EMBODIMENTS

Figure 3:
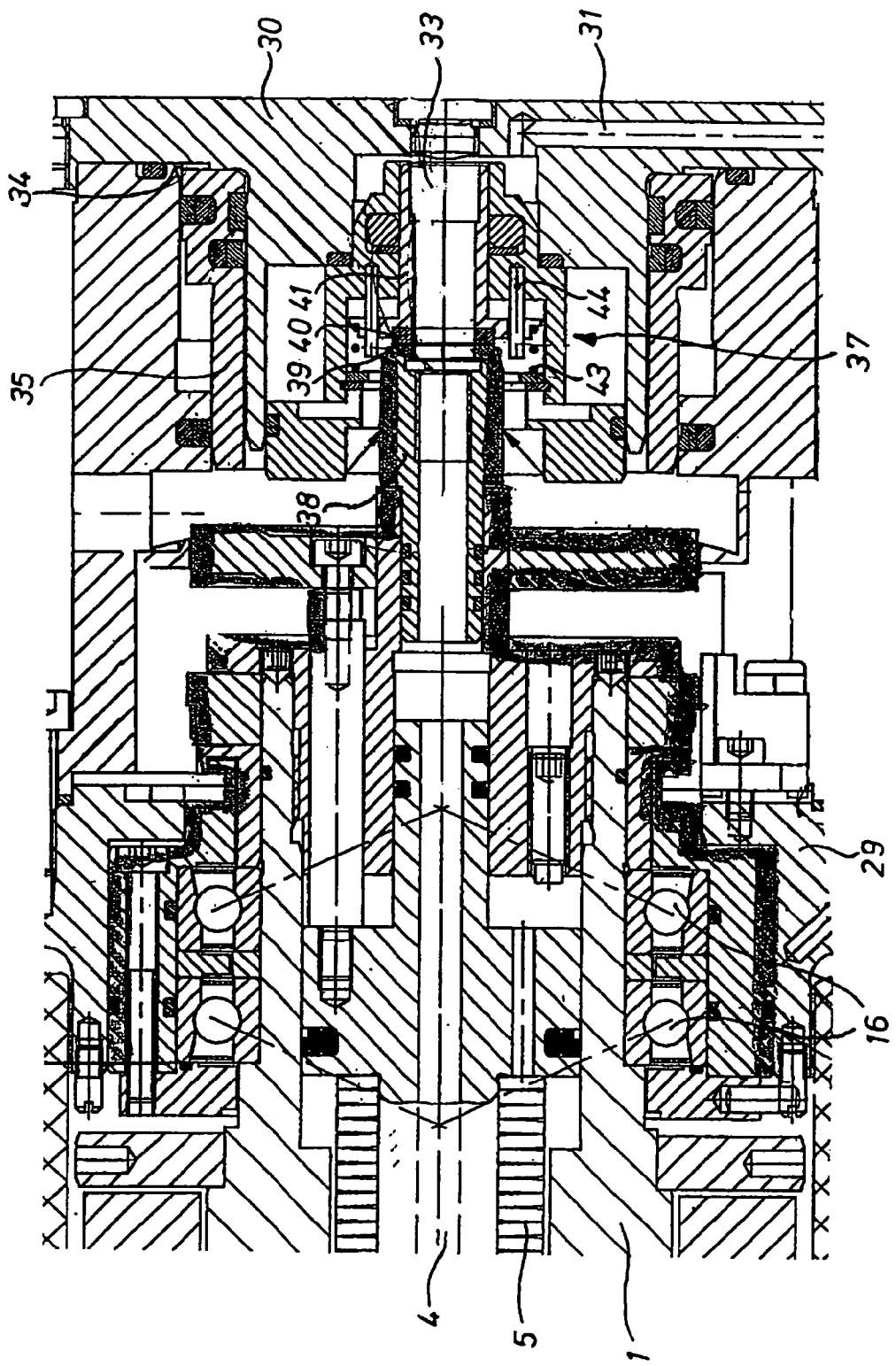
FIG. 3 is an enlarged part of the machine side end portion of the motor spindle of the invention in the form of an axial cross section, showing the FIGS. 1 and 2 assemblies coupled together.

The motor spindle shown in FIGS. 1 and 2 and consisting of the first assembly shown in FIG. 1 and the second assembly shown in FIG. 2, is designed for universal machine tools for milling and drilling metallic workpieces.

The assembly shown in FIG. 1 contains the continuously hollow work spindle 1 in the cavity of which clamping unit 2 is disposed. The clamping unit comprises a continuous clamping rod 3 having central longitudinal bore 4 forming a liquid duct. The clamping rod is limitedly shiftable in the axial direction within the cavity of work spindle 1 and is surrounded by spring unit 5 in its central portion, the spring unit biasing brace-like grippers 6 in the closing direction.

Rotor 7 of an electric drive motor is fixed between two support rings 8, 9 on the outer circumference of central portion of work spindle 1. Front support ring 8 is followed by jack 10 provided on thicker portion 11 of the work spindle and fixedly screwed to front head portion 12. The outer surface of a portion of jack 10 is aligned with the outer surface of rotor 7 and support rings 8, 9. The front end portion of work spindle 1 is supported in two spaced roller bearings 14, 15 and the rear portion of the work spindle is supported in roller bearing pair 16. The roller bearing pair is a part of a bearing arrangement of the rear portion of work spindle 1 and is fixed in rigid support ring 23. The support ring is fittingly insertable into a corresponding recess in ring 29 in housing 25, as is further explained with respect to FIGS. 2 and 3 below. Further, an axially parallel liquid duct 17 terminating adjacent to cone accommodation 18 is formed in the front portion of the work spindle, the rear end of liquid duct 17 being connected, via a cross bore, to the cavity of the work spindle into which rinsing liquid is supplied. Roller bearings 14, 15 are fixed in a stress-free manner in head portion 12. Further, the head is provided with ring-shaped duct 20 and axial duct 21 communicating with it. On an end flange 22 of the head 12 bores are provided for accommodating connecting screws 24 by which the assembly shown in FIG. 1 is mounted in the housing assembly shown in FIG. 2.

According to FIG. 2, the motor spindle comprises a substantially hollow cylindrical housing 25 which is fixed to a component, such as a machine slide (not shown), of the machine tool, with which the motor spindle is used, by screw connections via end side flange 26. Stator 27 is durably mounted on the central portion of the inner wall of housing 25, thereby forming the drive motor together with rotor 7 of the assembly shown in FIG. 1. The stator is supplied with electric current via a connector arrangement. Power supply 28 is fixed in ring 29 which is attached to the right face of housing 25 by screws. In a profiled cover 30 provided at the end side ducts 31 for the cooling liquid supply extend which are, on the one hand, connected to spigots 32 and, on the other hand, are connected with a central passage channel 33.

Further a ring-shaped cylinder 34 into which pressurized liquid is introduced via ducts (not shown) and which shifts a ring-shaped piston 35 acting on the spring washer set via catches and releasing the collect chuck in the conventional way is disposed in the right end portion of the housing assembly.

FIG. 3 shows an enlarged axial cross section of the right end portions of the two assemblies shown in FIGS. 1 and 2 in an assembled state. The thick, or grey, line in FIG. 3 is intended to indicate the "parting line" between the two assemblies. This combined motor spindle is configured to be mounted to the machine tool with which it operates by means of bolts (not shown) through the holes in flange 26.

In the central section within ring-shaped piston 35 arrangement 37, referred to as "rotational feedthrough," is disposed which comprises spigot 38 engaging with the hollow end portion of the work spindle. On its face, spigot 38 carries ring-shaped disk 39 of a wear-resistant sliding material, for example, bronze, ceramic, or the like. Sealing and sliding ring 40, attached to the face of an axially shiftable sleeve 41, is pressed with a predetermined spring force against the face of the ring-shaped disk 39. Sleeve 41 is provided with a radial flange on which a spring 43 acts and which slides along guiding pins 44 fixed to the housing.

In the operating state shown in FIG. 3, cooling liquid flows through supply channel 31 formed in lid 30 and into cavity 33 and from there into liquid duct 4 provided in clamping rod 3 of work spindle 1.

What is claimed is:

1. A motor spindle for machine tools, the electric motor of the motor spindle having a rotor and stator, the motor spindle comprising:
   a first modular assembly comprising:
      a work spindle;
      said rotor of said motor;
      a clamping unit for a tool disposed in said work spindle; and
      axially spaced bearings on said work spindle;
   a spindle housing assembly comprising:
      said stator of said motor;
      a hydraulic ring cylinder; and
      an internal coolant supply for the tool integrated in said clamping unit and comprising a rotational feedthrough for the coolant provided inside of said hydraulic ring cylinder;
   said clamping unit being operable by said hydraulic ring cylinder against the force of a spring unit;
   said hydraulic ring cylinder being configured for releasing said clamping unit, said hydraulic ring cylinder and said rotational feedthrough being disposed in an end of said spindle housing; and
   said first modular assembly being releasably secured within said spindle housing assembly.

2. The motor spindle according to claim 1, wherein said rotational feedthrough comprises a sealing sleeve configured to be pressed against a stub by a spring force and is longitudinally shiftable inside said spindle housing assembly.

3. The motor spindle according to claim 2, wherein said stub is a part of the detachable assembly comprising said work spindle.

4. The motor spindle according to claim 2, wherein said sealing sleeve and said stub each comprise a wear-resistant sealing and sliding ring.

5. The motor spindle according to claim 3, wherein said sealing sleeve and said stub each comprise a wear-resistant sealing and sliding ring.

6. The motor spindle according to claim 2, and further comprising a spring and a plurality of axially parallel guiding pins for said sealing sleeve disposed in said spindle housing assembly radially inside of said hydraulic ring cylinder.

7. The motor spindle according to claim 3, and further comprising a spring and a plurality of axially parallel guiding pins for said sealing sleeve disposed in said spindle housing assembly radially inside of said hydraulic ring cylinder.

8. The motor spindle according to claim 4, and further comprising a spring and a plurality of axially parallel guiding pins for said sealing sleeve disposed in said spindle housing assembly radially inside of said hydraulic ring cylinder.

9. The motor spindle according to claim 1, and further comprising a rigid support ring configured to be inserted into a corresponding recess in said spindle housing assembly, one portion of said axially spaced bearings of said work spindle being fixed in said rigid support ring.

10. The motor spindle according to claim 2, and further comprising a rigid support ring configured to be inserted into a corresponding recess in said spindle housing assembly, one portion of said axially spaced bearings of said work spindle being fixed in said rigid support ring.

11. The motor spindle according to claim 3, and further comprising a rigid support ring configured to be inserted into a corresponding recess in said spindle housing assembly, one portion of said axially spaced bearings of said work spindle being fixed in said rigid support ring.

12. The motor spindle according to claim 4, and further comprising a rigid support ring configured to be inserted into a corresponding recess in said spindle housing assembly, one portion of said axially spaced bearings of said work spindle being fixed in said rigid support ring.

13. The motor spindle according to claim 5, and further comprising a rigid support ring configured to be inserted into a corresponding recess in said spindle housing assembly, one portion of said axially spaced bearings of said work spindle being fixed in said rigid support ring.

14. The motor spindle according to claim 6, and further comprising a rigid support ring configured to be inserted into a corresponding recess in said spindle housing assembly, one portion of said axially spaced bearings of said work spindle being fixed in said rigid support ring.

15. The motor spindle according to claim 7, and further comprising a rigid support ring configured to be inserted into a corresponding recess in said spindle housing assembly, one portion of said axially spaced bearings of said work spindle being fixed in said rigid support ring.

16. The motor spindle according to claim 8, and further comprising a rigid support ring configured to be inserted into a corresponding recess in said spindle housing assembly, one portion of said axially spaced bearings of said work spindle being fixed in said rigid support ring.

* * * * *